Nov. 21, 1961 — W. VOIGT — 3,009,200
EXTRUSION ARRANGEMENT FOR PRODUCING FOILS
Filed July 25, 1957 — 2 Sheets-Sheet 1
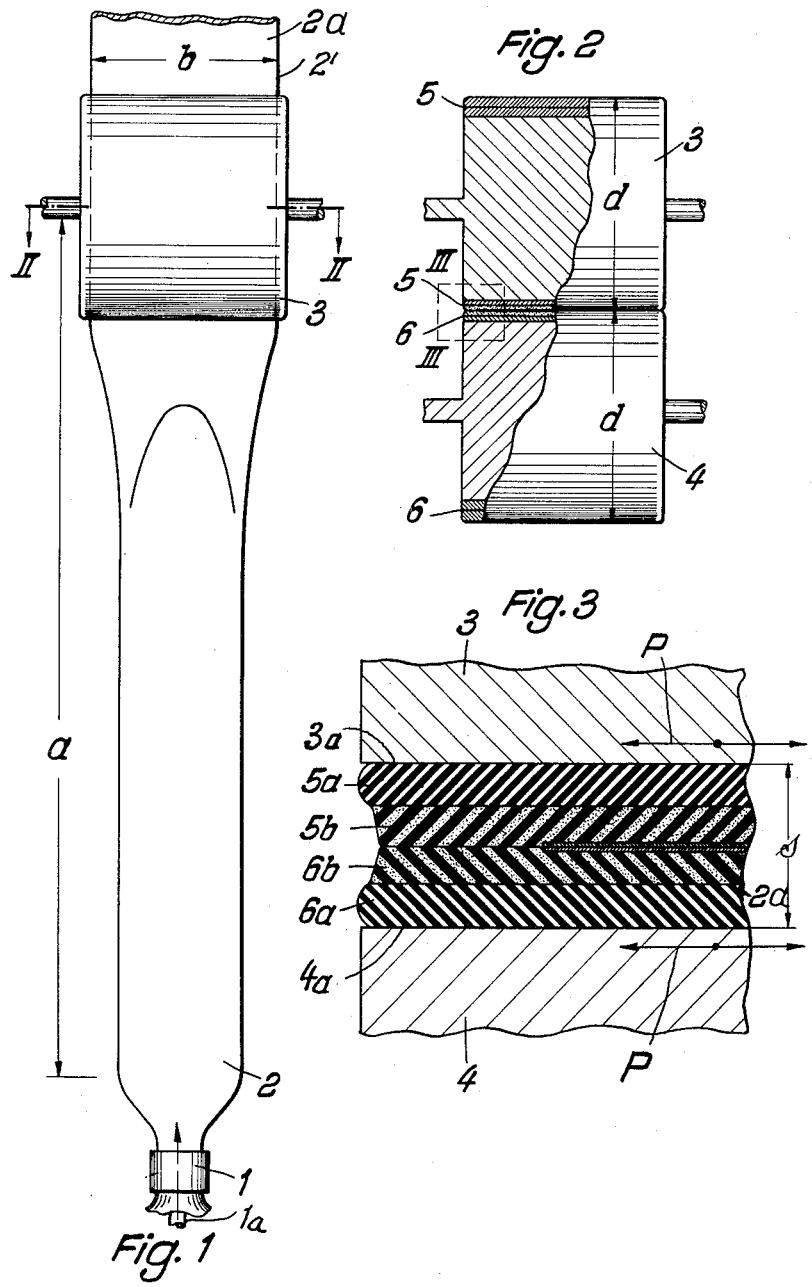
Inventor:
Wilfried Voigt
BY: Michael S. Striker
Attorney

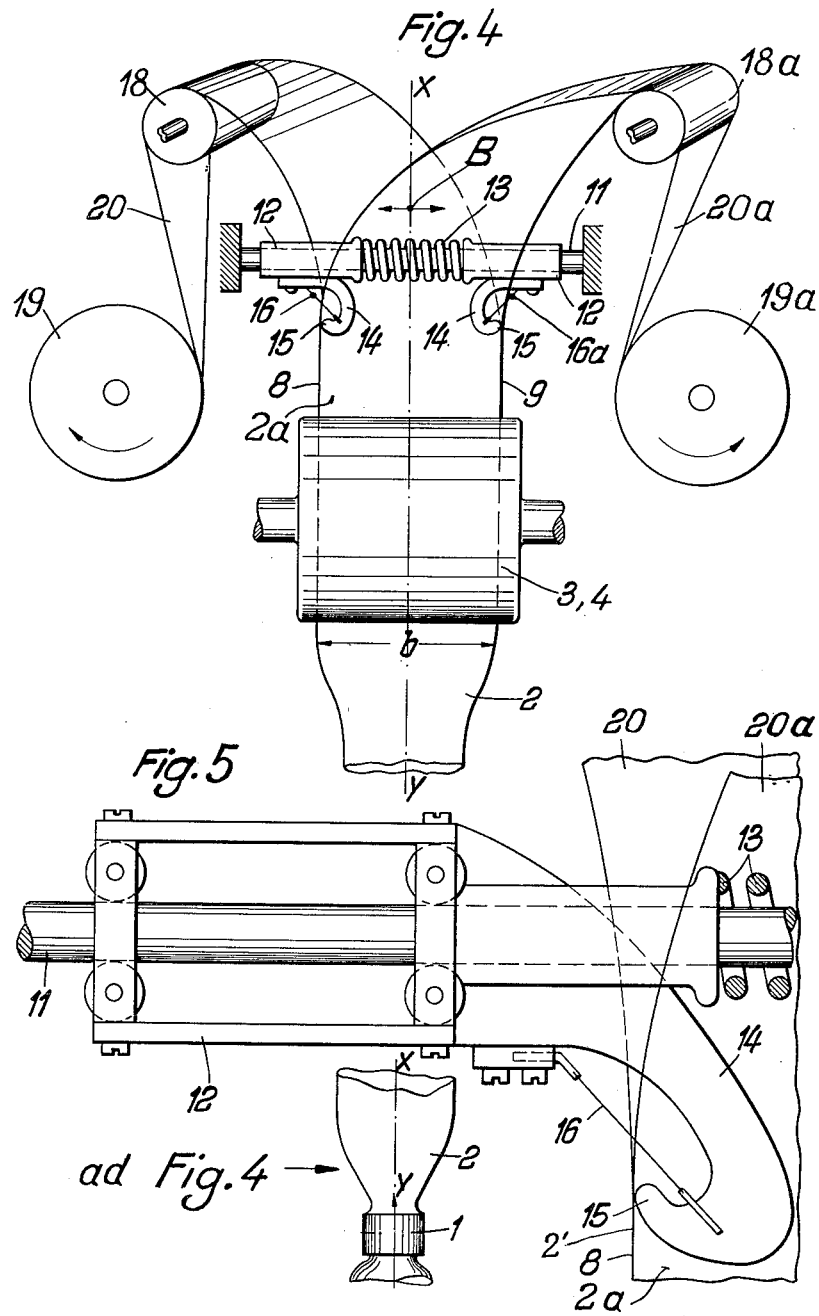

United States Patent Office 3,009,200
Patented Nov. 21, 1961

3,009,200
EXTRUSION ARRANGEMENT FOR
PRODUCING FOILS
Wilfried Voigt, Wiesbaden-Biebrich, Germany, assignor, by mesne assignments, to Lonza Electric and Chemical Works Limited, Gampel (Wallis), Switzerland
Filed July 25, 1957, Ser. No. 674,105
Claims priority, application Switzerland July 31, 1956
9 Claims. (Cl. 18—14)

The present invention relates to an extrusion arrangement for producing foils of artificial thermoplastic material, and more particularly to a method and apparatus by which wrinkle-free foils are produced of an extruded tube.

It is known to produce foils of thermoplastic artificial materials by extruding the material in the form of a thin-walled tube which is flattened between rollers to form two superimposed foils connected to each other along longitudinal edge folds, whereupon the longitudinal folds are cut to produce two separated foils.

The flattening rollers close the end of the extruder tube so that the same can be inflated to a greater diameter.

The known constructions have the disadvantage that folds and wrinkles form in the superimposed foils between the flattening rollers. It is of course highly desirable to have the foils leave the machine in completely straight and wrinkle-free condition.

It is one object of the present invention to overcome this disadvantage of the known art, and to provide an arrangement for producing wrinkle-free foils of thermoplastic materials.

It is another object of the present invention to produce wrinkle-free foils by spacing apart the extrusion means and the flattening rollers a distance being in a certain relation with the width of the flattened tube.

It is another object of the present invention to produce wrinkle-free foils by employing flattening rollers having a diameter in a predetermined ratio with respect to the width of the flattened tube.

It is another object of the present invention to produce wrinkle-free foils by providing the flattening rollers with elastic covers which serve to spread apart the flattened tube.

It is a further object of the present invention to produce wrinkle-free foils by spreading the flattened tube apart while cutting the same along the longitudinal folds thereof.

In accordance with the present invention, the distance between the extrusion means and the flattening rollers is at least five times the width of the flattened tube, and the diameters of the flattening rollers are greater than the width of the flattened tube. Due to this arrangement, the formation of wrinkles in the flattened tube is prevented.

It has been found that the tendency of the superimposed foils of the flattened tube to form wrinkles, increases when the wall thickness of the tube is decreased, and the width of the flattened tube is increased. However, in accordance with the present invention even very thin-walled tubes can be flattened in wrinkle-free condition if at least one of the flattening rollers is provided with a pair of covers including an inner cover consisting of a non-compressible elastic material, and an outer cover consisting of a compressible elastic material.

The term "compressible elastic material" is used in the present application to denote a resilient material of the foam-rubber or foam-plastic type. This kind of elastic material, when compressed in one direction, is reduced in volume without substantially expanding in the other directions.

The term "non-compressible elastic material" is used in the present application to denote a resilient material of the rubber type. This kind of material, when compressed in one direction, will expand in the other directions to substantially retain its initial volume.

An extrusion arrangement according to this aspect of the present invention mainly comprises extrusion means for extruding artificial thermoplastic material in the form of a tube; inflating means associated with the extrusion means for inflating the thus extruded tube to a greater diameter; a pair of rollers for flattening the inflated tube to form two superimposed foils; a tubular inner cover consisting of a non-compressible elastic material enveloping at least one of said rollers; and a tubular outer cover consisting of a compressible elastic material enveloping said roller and said inner tubular cover.

The tubular covers are compressed in the gap between the rollers, whereby the inner cover is forced to spread out in axial direction of the rollers so that the superimposed foils are expanded in transverse direction whereby the formation of wrinkles in the superimposed foils between the rollers is prevented.

Preferably, the inner and outer covers are provided on both rollers, and are compressed to less than half their initial thickness.

After the tube has been flattened between the rollers, in accordance with the present invention the flattened tube is engaged by guides along the inside of the longitudinal folds thereof, and the thus tensioned flattened tube is cut along the longitudinal edges thereof to form two separated foils which are wound up on two take-up reels.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary plan view illustrating an embodiment of the present invention;

FIG. 2 is a sectional view taken on line II—II in FIG. 1;

FIG. 3 is a sectional view illustrating on an enlarged scale a detail indicated in FIG. 2 by the broken line III—III;

FIG. 4 is a plan view illustrating the arrangement for separating the two superimposed foils in accordance with the present invention; and FIG. 5 is a fragmentary plan view illustrating a detail of FIG. 4 on an enlarged scale.

Referring now to the drawings, and more particularly to FIGS. 1 and 4, an extrusion means 1 has an annular nozzle through which artificial thermoplastic material is extruded in the form of a tube 2. An inflating pipe 1a passes through the center of the extrusion means 1 and inflates the tube 2 by compressed air so that the diameter of the inflated tube is greater than the diameter of the annular extrusion nozzle.

A pair of rollers 3 is provided between which the inflated tube is flattened to form two superimposed foils 2a which are connected along longitudinal folds 2' extending along the longitudinal edges of the flattened tube.

The flattened tube is then cut along the longitudinal folds 2', as will be described hereinafter in greater detail with reference to FIGS. 4 and 5.

The flattened tube 2a has the tendency to form wrinkles between the flattening rollers 3. In accordance with the present invention, the formation of wrinkles is prevented, or at least substantially reduced, if the distance $a$, which is substantially the distance between the axes of the rollers 3 and the extrusion means 1, is made at least five times the width $b$ of the flattened tube. Such width is substantially half of the circumference of the inflated tube 2.

Formation of wrinkles in the flattened tube between the flattening rollers is also prevented, or substantially reduced, if the diameter $d$ of the rollers is made greater than the width $b$ of the flattened tube. A combination of the above explained relative dimensions is of course most effective.

In accordance with the present invention, at least one of the rollers 3 and 4, and preferably both rollers 3 and 4 are provided with inner and outer covers respectively consisting of a non-compressible elastic material and of compressible elastic material. This aspect of the present invention will now be described with reference to FIGS. 2 and 3.

Each of the rollers 3 and 4 is provided with an inner tubular cover 5a and 6a, respectively, which consist of a non-compressible elastic material such as rubber or synthetic rubber which has the tendency to spread in axial direction of the rollers when compressed between the rollers 3 and 4. Each roller, and inner cover, is enveloped by a tubular outer cover 5b and 6b, respectively, which consists of a compressible elastic material such as polyethylene foam. Material of this type will not spread in axial direction when compressed between the pair of rollers 3 and 4.

In accordance with the present invention, the rollers 3 and 4 are spaced apart so that the gap between the outer surfaces 3a and 4a is substantially narrower than the thickness of the four layers 5a, 5b, 6a, and 6b.

Consequently, the inner and outer covers are subjected to great pressure during passage of the flattened tube 2a, and such pressure will result in axial spreading of the tubular covers 5a and 6a while the substantially compressed tubular covers 5b and 6b transfer the axial forces P to the flattened tube 2a, resulting in spreading of the flattened tube 2a in axial direction of the rollers whereby the formation of wrinkles in the flattened tube is prevented.

According to a preferred embodiment of the present invention, the distance $s$ which is the width of the gap between the rollers 3 and 4, is less than half the total thickness of the two inner covers 5a and 6a and the two outer covers 5b and 6b.

It is necessary to cut the flattened tube along the longiturinal edges thereof to separate the two superimposed foils. In accordance with the present invention, such cutting of the flattened tube is carried out in a manner which prevents the displacement of the portion of the flattened tube which is located between the rollers which is important in view of the fact that such displacement may cause wrinkles in the foils.

Referring now to FIG. 4, an elongated supporting means 11 is provided on the side of the rollers 3 and 4 remote from the extrusion means 1. The supporting means 11 is a shaft extending parallel to the axes of the rollers 3 and 4. A pair of slides 12, best seen in FIG. 5, are provided with wheels 12a which roll along the shaft 11. A spring 13 is mounted on the shaft 11 between the slides 12, and urges the two slides 12 apart. A guide 14 is secured to each slide 12 and has a hook-shaped end portion 15. An inclined wire 16 extends between each hook-shaped end portion and the base of the guide 14. As is clearly shown in FIGS. 4 and 5, the hook-shaped end portion of the guide 14 projects into the interior of the flattened tube 2a, each end portion 15 engaging the inside of the longitudinal folds along the edges 2'. Since the spring means 13 urge the slides 12 and the guides 14 apart, the flattened tube is expanded in transverse direction whereby the two superimposed foils are straightened and remain free of wrinkles. At the same time the wrinkle-free passage of the flattened tube 2a through the rollers 3 and 4 is facilitated.

Due to the fact that the inclined wires 16 and 16a respectively engage the two longitudinal folds of the flattened tube, the flattened tube is cut along the longitudinal edges thereof and separated into two separated foils 20 and 20a. The foils 20 and 20a are respectively guided over rollers 18 and 18a, and then wound up on two take-up reels 19 and 19a, respectively.

It should be noted that the wires 16 and 16a are inclined to the direction of the axes of the rollers 3 and 4 and to the longitudinal edges 2' so that a very clean cut is produced by the cutting means 16 and 16a. Moreover, the wires 16 and 16a are forced apart by the spring 13 acting on the slides 12 so that a certain pressure is exerted by the wires 16 and 16a against the folds of the flattened tube.

The cutting wires 16 and 16a have diameters of approximately 0.5 to 1 mm., and are preferably electrically heated to a temperature of about 200° to 300° C. Thereby the folds which are tensioned by the hook-shaped end portions 15 and 15a are melted so that the flattened tube is cut along the longitudinal edges 2' thereof. It will be noted that the term "cut" is used in the present application in a broader sense to include the melting of a thermoplastic material along a separating line.

The mounting of the guides 14 and of the cutting means 16 and 16a on the slides 12 has the advantage that due to the action of the springs 13, variations of the width $b$ of the flattened tube 2a are compensated. In the event that the tube 2 is inflated to a smaller diameter, its wall thickness is greater, but its width $b$ is lesser. In this event, a greater force acts on the end portions 15 and on the cutting means 16, as is required for cutting through a thicker material. In the event however that the tube 2 is inflated to a greater diameter, its wall-thickness is smaller, and since a greater diameter results in a greater width $b$, which is half the circumference of the inflated tube 2, the force P is also smaller since the spring means 13 are less compressed.

Variations in the width of the flattened tube 2a are consequently automatically compensated by the action of the spring 13 on the slides 12.

In a similar manner, a displacement of the axis of symmetry $x$—$y$ of the tube 2, 2a is compensated by independent movement of the two slides 12 under the action of spring 13. The spreading and flattening actions of the end portions 15 of the guide 14 is not influenced by a displacement of the axis of symmetry of the extruded tube.

It will be understood that each of the elements described above, or two or more together, may also find a useful application in other types of extrusion arrangements differing from the types described above.

While the invention has been illustrated and described as embodied in an arrangement for producing wrinkle-free foils of extruded thermoplastic material, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Extrusion arrangement comprising, in combination, extrusion means for extruding artificial thermoplastic material in the form of a tube; inflating means associated with said extrusion means for inflating the thus extruded tube to a greater diameter; a pair of rollers, said rollers being adapted to flatten said inflated tube to form two superimposed foils connected by longitudinal folds along the longitudinal edges thereof; a pair of guides located on the side of said rollers remote from said extrusion means and projecting toward said rollers, said guides being adapted to project into the space between said superimposed foils and to engage, respectively, said longitudinal folds; resilient means connected to said pair of guides for urging the same apart in axial direction of said rollers whereby said flattened tube is spread; cutting means for cutting said longitudinal edges of said superimposed foils, said cutting means being located on the side of said rollers and guides remote from said extrusion means, said cutting means including electrically heated wires inclined in opposite directions with respect to the axes of said rollers and being respectively secured to said guides so as to be urged apart by said resilient means, said wires being adapted to project into the space between said superimposed foils and to be inclined to said longitudinal folds; and a pair of take-up reels for winding up the separated foils.

2. Extrusion arrangement comprising, in combination, extrusion means for extruding material in the form of a tube; inflating means for inflating the thus extruded tube to a greater diameter; a pair of rollers spaced from each other to form a gap; a tubular inner cover consisting of a non-compressible elastic material enveloping each of said rollers; a second tubular outer cover consisting of a compressible elastic material enveloping each of said rollers and the respective inner tubular cover, the total radial thickness of said first and second covers being greater than twice said radial distance between said rollers so that said first and second covers are compressed in the gap between said rollers to less than half the total radial thickness thereof whereby said inner covers spread in axial direction of said rollers, said rollers being adapted to flatten said inflated tube between said outer covers to form two superimposed foils connected by longitudinal folds along the longitudinal edges thereof; a pair of guides located on the side of said rollers remote from said extrusion means, each of said guides having a hook-shaped end portion adapted to project into the space between said superimposed foils and to engage one of said longitudinal folds; resilient means connected to said pair of guides for urging the same apart in axial direction of said rollers; cutting means including a pair of electrically heated wires respectively inclined in opposite directions with respect to the axes of said rollers, each of said wires being secured at the ends thereof to one of said guides so as to extend along a chord across the respective hook-shaped end portion of the respective guide, said wires being adapted to project into the space between said superimposed foils and to engage said longitudinal folds in a position inclined to said folds for cutting the same; and a pair of take-up reels for winding up the separated foils.

3. Extrusion arrangement comprising, in combination, extrusion means for extruding artificial thermoplastic material in the form of a tube; inflating means associated with said extrusion means for inflating the thus extruded tube to a greater diameter; a pair of rollers, said rollers having outer cylindrical surfaces spaced from each other a selected radial distance to form a gap, said rollers being adapted to flatten said inflated tube to form two superimposed foils connected by longitudinal folds along the longitudinal edges thereof; a pair of guides located on the side of said rollers remote from said extrusion means, said guides being adapted to project into the space between said superimposed foils and to engage, respectively, said longitudinal folds; a supporting means extending parallel to the axes of said rollers and being located on the side of the same remote from said extrusion means; a pair of slides mounted on said supporting means for movement along the same in axial direction, each of said slides supporting one of said guides for movement in axial direction of said rollers; spring means abutting against said slides and located between the same for urging said slides and guides apart whereby said flattened tube is spread; a pair of heated cutting means for cutting said longitudinal edges of said superimposed foils, said cutting means being located on the side of said rollers and respectively secured to said slides remote from said extrusion means and adapted to project into the space between said superimposed foils; and a pair of take-up reels for winding up the separated foils.

4. Extrusion arrangement comprising, in combination, extrusion means for extruding material in the form of a tube; inflating means for inflating the thus extruded tube to a greater diameter; a pair of rollers spaced from each other to form a gap; a tubular inner cover consisting of a non-compressible elastic material enveloping each of said rollers; a second tubular outer cover consisting of a compressible elastic material enveloping each of said rollers and the respective inner tubular cover, the total radial thickness of said first and second covers being greater than twice said radial distance between said rollers so that said first and second covers are compressed in the gap between said rollers to less than half the total radial thickness thereof whereby said inner covers spread in axial direction of said rollers, said rollers being adapted to flatten said inflated tube between said outer covers to form two superimposed foils connected by longitudinal folds along the longitudinal edges thereof; a pair of guides located on the side of said rollers remote from said extrusion means, each of said guides having a hook-shaped end portion adapted to project into the space between said superimposed foils and to engage one of said longitudinal folds; a supporting means extending parallel to the axes of said rollers and being located on the side of the same remote from said extrusion means; a pair of slides mounted on said supporting means for movement along the same in axial direction, each of said slides supporting one of said guides for movement in axial direction of said rollers; spring means abutting against said slides and located between the same for urging said slides and guides apart; cutting means including a pair of electrically heated wires respectively inclined in opposite directions with respect to the axes of said rollers, each of said wires being secured at the ends thereof to one of said guides so as to extend along a chord across the respective hook-shaped end portion of the respective guide, said wires being adapted to project into the space between said superimposed foils and to engage said longitudinal folds in a position inclined to said folds for cutting the same; and a pair of take-up reels for winding up the separated foils.

5. A pair of cooperating rotary rollers having parallel straight axes; a tubular inner cover consisting of a non-compressible elastic material enveloping at least one of said rollers and having opposite ends freely spreadable in axial direction on said one roller; and a tubular outer cover consisting of a compressible elastic material enveloping said inner tubular cover, said axes of said rollers being spaced from each other such a distance that said outer and inner covers are resiliently deformed by the radial pressure developed while an inflated tube passes between said rollers so as to be flattened, only said inner cover being spread in axial direction by the radial pressure while said compressible elastic cover in compressed condition is taken along and extended in axial direction by said spread inner cover whereby the formation of folds and wrinkles in said flattened tube is prevented.

6. A pair of cooperating rotary rollers having parallel axes; a tubular inner cover consisting of a non-compressible elastic material enveloping each of said rollers and having opposite ends freely spreadable in axial direction on the respective roller; and a tubular outer cover consisting of a compressible elastic foam material and enveloping said inner tubular covers of each of said rollers, the axes of said rollers being spaced from each other such a distance that said outer and inner covers are resiliently deformed by the radial pressure developed when an inflated tube is flattened between said outer covers, said inner covers only being spread in axial direction by the radial pressure while said compressible elastic covers in compressed condition are taken along and extended in axial direction by said spread inner covers whereby the formation of folds and wrinkles in the flattened tube is prevented.

7. Extrusion arrangement comprising, in combination, extrusion means for extruding artificial thermoplastic material in the form of a tube; inflating means associated with said extrusion means for inflating the thus extruded tube to a greater diameter; a pair of rollers for flattening said inflated tube to form two superimposed foils; a tubular inner cover consisting of a non-compressible elastic material enveloping at least one of said rollers and having opposite ends freely spreadable in axial direction on said one roller; and a tubular outer cover consisting of a compressible elastic material enveloping said roller and said inner tubular cover, said rollers being spaced from each other such a distance that said outer and inner covers are resiliently deformed by radial pressure developed when an inflated tube passes between the rollers so as to be flattened, only said inner non-compressible elastic cover being spread in axial direction of said roller by the radial pressure while said compressible elastic cover in compressed condition is taken along and extended in axial direction by said spread inner cover whereby the formation of folds and wrinkles in said superimposed foils is prevented.

8. Extrusion arrangement comprising, in combination, extrusion means for extruding artificial thermoplastic material in the form of a tube; inflating means associated with said extrusion means for inflating the thus extruded tube to a greater diameter; a pair of rollers, said rollers having outer cylindrical surfaces spaced from each other a selected radial distance to form a gap; a tubular inner cover consisting of a non-compressible elastic material enveloping each of said rollers, having a first radial thickness and having opposite ends freely spreadable in axial direction on the respective roller; and a second tubular outer cover consisting of a compressible elastic material enveloping each of said rollers and the respective inner tubular cover, said outer covers having a second radial thickness, the total radial thickness of said first and second covers being greater than twice said radial distance between said outer surfaces of said rollers so that said first and second covers are compressed in the gap between said rollers to less than half the total radial thickness thereof so that said outer and inner covers are resiliently deformed by the radial pressure developed when the inflated tube is flattened between said outer covers to form two superimposed foils having a width of half the circumferences of said inflated tube, only said inner non-compressible covers being spread in axial direction by the radial pressure while said compressible covers in compressed condition are taken along and extended in axial direction by said spread inner covers whereby due to the axial spreading of said inner covers said superimposed foils are expanded in axial direction and the formation of folds and wrinkles in said superimposed foils is prevented.

9. Extrusion arrangement comprising, in combination, extrusion means for extruding artificial thermoplastic material in the form of a tube; inflating means associated with said extrusion means for inflating the thus extruded tube to a greater diameter; a pair of rollers, said rollers having outer cylindrical surfaces spaced from each other a selected radial distance to form a gap; tubular inner cover consisting of a non-compressible elastic material enveloping each of said rollers, having a first radial thickness and having opposite ends freely spreadable in axial direction on the respective roller; and a second tubular outer cover consisting of a compressible elastic material enveloping each of said rollers and the respective inner tubular cover, said outer covers having a second radial thickness, the total radial thickness of said first and second covers being greater than twice said radial distance between said outer surfaces of said rollers so that said first and second covers are compressed in the gap between said rollers to less than half the total radial thickness thereof so that said outer and inner covers are resiliently deformed by the radial pressure developed when the inflated tube is flattened between said outer covers to form two superimposed foils having a width of half the circumference of said inflated tube, said rollers being spaced from said extrusion means a distance at least five times the width of said superimposed foils and each of said rollers having a diameter greater than the width of said superimposed foils, only said inner non-compressible covers being spread in axial direction by the radial pressure while said compressible covers in compressed condition are taken along and extended in axial direction by said spread inner covers whereby the formation of folds and wrinkles in said superimposed foils is prevented.

References Cited in the file of this patent

UNITED STATES PATENTS

| | | |
|---|---|---|
| 2,340,260 | Clunan | Jan. 25, 1944 |
| 2,551,966 | Pierce | May 8, 1951 |
| 2,582,280 | Robertson | Jan. 15, 1952 |
| 2,632,206 | Pierce | Mar. 24, 1953 |
| 2,720,680 | Gerow | Oct. 18, 1955 |
| 2,750,631 | Johnson | June 19, 1956 |
| 2,923,194 | Ambler et al. | Feb. 2, 1960 |